United States Patent
Miller

(10) Patent No.: US 10,614,648 B2
(45) Date of Patent: Apr. 7, 2020

(54) METHOD FOR OPERATING A MOTOR VEHICLE LOCKING SYSTEM FOR A MOTOR VEHICLE, AND CENTRAL SERVER DEVICE FOR A MOTOR VEHICLE

(71) Applicant: AUDI AG, Ingolstadt (DE)

(72) Inventor: Marc Miller, München (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/464,136

(22) PCT Filed: Nov. 23, 2017

(86) PCT No.: PCT/EP2017/080205
§ 371 (c)(1),
(2) Date: May 24, 2019

(87) PCT Pub. No.: WO2018/104065
PCT Pub. Date: Jun. 14, 2018

(65) Prior Publication Data
US 2019/0392663 A1     Dec. 26, 2019

(30) Foreign Application Priority Data
Dec. 5, 2016  (DE) .......................... 10 2016 224 155

(51) Int. Cl.
*G07C 9/00* (2020.01)
*B60R 25/20* (2013.01)
*B60R 25/24* (2013.01)

(52) U.S. Cl.
CPC ...... *G07C 9/00571* (2013.01); *B60R 25/2018* (2013.01); *B60R 25/24* (2013.01);
(Continued)

(58) Field of Classification Search
CPC .......... B60R 25/04; G05B 13/00; F02P 11/04; E05B 17/22; G08B 21/00; G08B 29/00; G05D 1/00; G07C 9/00
(Continued)

(56) References Cited

U.S. PATENT DOCUMENTS 7,312,691 B2 * 12/2007 Zambo .................... B60R 25/04
                                                     340/5.21
7,613,551 B2    11/2009 Watanabe et al.
(Continued)

FOREIGN PATENT DOCUMENTS

DE     19802532 C1    8/1999
DE     19912319 C1    10/2000
(Continued)

OTHER PUBLICATIONS

German Search Report dated Jul. 12, 2017 in corresponding German Application No. 10 2016 224 155.9; 20 pages.
(Continued)

*Primary Examiner* — Nam V Nguyen
(74) *Attorney, Agent, or Firm* — Maier & Maier, PLLC

(57) ABSTRACT

A method for operating a motor vehicle locking system for a motor vehicle. A central server device receives an unlocking signal having an unlocking instruction about unlocking of at least one closing device of the motor vehicle. The central server device adds a conditional locking instruction to the unlocking signal, which includes after at least one predetermined duration T after unlocking of the at least one closing device of the motor vehicle, checking for a connection criterion and, in the case of an infringed connection criterion, locking the at least one closing device again. The unlocking signal having the unlocking instruction and the added conditional locking instruction is transmitted via a
(Continued)

communication connection to a motor-vehicle-internal control device of the motor vehicle.

6 Claims, 1 Drawing Sheet

(52) U.S. Cl.
CPC .... *B60R 2325/106* (2013.01); *G07C 2209/08* (2013.01); *G07C 2209/63* (2013.01)

(58) Field of Classification Search
USPC ............... 340/686.6, 5.61, 5.21; 713/182
See application file for complete search history.

(56) References Cited

U.S. PATENT DOCUMENTS

| | | | | |
|---|---|---|---|---|
| 8,019,488 | B2* | 9/2011 | Taki | B60R 25/2018 |
| | | | | 701/2 |
| 8,849,519 | B2* | 9/2014 | Westra | G06F 21/44 |
| | | | | 701/29.6 |
| 9,716,762 | B2* | 7/2017 | Petersen | H04L 67/12 |
| 9,858,737 | B2* | 1/2018 | Davidsson | E05B 49/00 |
| 9,896,063 | B2* | 2/2018 | Poma | G07C 9/00174 |
| 10,163,286 | B2* | 12/2018 | Gennermann | B60R 25/24 |
| 10,332,328 | B2* | 6/2019 | Delevoye | G07C 5/008 |
| 2006/0143463 | A1* | 6/2006 | Ikeda | B60R 25/04 |
| | | | | 713/182 |
| 2010/0201536 | A1* | 8/2010 | Robertson | G07C 9/00904 |
| | | | | 340/686.6 |
| 2015/0332531 | A1 | 11/2015 | Davidsson et al. | |

FOREIGN PATENT DOCUMENTS

| | | |
|---|---|---|
| DE | 10334624 A1 | 3/2005 |
| DE | 102012002758 A1 | 8/2013 |
| DE | 102015104651 A1 | 10/2015 |
| DE | 102015205300 A1 | 9/2016 |
| EP | 2199503 A2 | 6/2010 |
| EP | 2500873 A2 | 9/2012 |
| EP | 2945129 A1 | 11/2015 |

OTHER PUBLICATIONS

International Search Report and Written Opinion dated Feb. 21, 2018 in corresponding application No. PCT/EP2017/080205; 36 pgs.

Decision to Grant a Patent dated Apr. 9, 2019 in corresponding German Application No. 10 2016 224 155.9; 20 pages.

International Preliminary Report on Patentability (Chapter I) dated Jun. 20, 2019, in corresponding application No. PCT/EP2017/080205; 8 pages.

* cited by examiner

METHOD FOR OPERATING A MOTOR VEHICLE LOCKING SYSTEM FOR A MOTOR VEHICLE, AND CENTRAL SERVER DEVICE FOR A MOTOR VEHICLE

FIELD

The invention relates to a method for operating a motor vehicle locking system for a motor vehicle. Furthermore, the present invention relates to a central server device for a motor vehicle.

BACKGROUND

Remotely controlling a closing device of a motor vehicle via a central server device is known from the prior art. Thus, a method is known from US 2015/0332531 A1, in which a temporary access to a closed region of the motor vehicle is granted to a user of a motor vehicle. For this purpose, the motor vehicle is designed to communicate with an intermediary system. The intermediary system is designed to receive a request to open the remote-controllable closing device from a user device and to relay this request of the motor vehicle.

DE 198 02 532 C1 describes how a closing system of a vehicle is activated to lock via a locking command. It is subsequently recognized whether a transponder is located in the interior of the vehicle and it is decided in dependence thereon whether the closing system will be unlocked again. A system for the remote control of door and lid locks of a vehicle is disclosed in EP 2 500 873 A2. After locking of the vehicle and subsequent separate opening of a baggage compartment lid of the vehicle, after closing of the baggage compartment lid, in the course thereof an actuating element, which is designed for locking and unlocking the baggage compartment lid, is locked after a predetermined time delay.

It is disadvantageous in the case of a closing device remote-controllable by a central server device that a communication connection cannot be ensured between the motor vehicle and the central server device, so that a possibly unlocked motor vehicle cannot be locked via the central server device. If a user is not capable of locking the motor vehicle manually or via a radio key, the motor vehicle remains unlocked. The motor vehicle itself and objects located in the motor vehicle are thus at risk of theft.

SUMMARY

The object of the present invention is to provide a method for operating a motor vehicle locking system for a motor vehicle having at least one remote-controllable locking device, which offers a high level of theft protection for the motor vehicle.

This object is achieved by the subjects of the independent patent claims. Advantageous refinements of the invention are disclosed by the dependent claims, the following description, and the figures.

The present invention is based on the finding that remote-controlled unlocking of the vehicle is to be linked to a condition for a high level of theft protection. The condition links the remote-controlled unlocking of at least one closing device of a motor vehicle to subsequent monitoring of a communication connection between the motor vehicle and a central server device. It is thus recognizable if it is impossible for the motor vehicle to be able to be locked again by remote control. For this purpose, each unlocking instruction has to be supplemented with this condition.

Thus, according to the invention, in the method for operating a motor vehicle locking system, in a first method step, an unlocking signal is received by a central server device. The unlocking signal comprises at least one unlocking instruction about unlocking of the at least one closing device of the motor vehicle. The unlocking signal received by the central server device can have been transmitted in this case in a known manner from a device of the user of the motor vehicle and/or a service provider via a mobile wireless connection and/or an Internet connection.

In a second method step, the central server device establishes a communication connection to a motor-vehicle-internal control device of the motor vehicle. This communication connection can be provided, for example, by means of an Internet connection. The central server device adds a conditional locking instruction to the unlocking signal. The conditional locking instruction comprises, after passage of at least one predetermined duration after the unlocking of the at least one closing device of the motor vehicle, checking for a connection criterion and if the connection criterion is infringed, locking the at least one closing device of the motor vehicle. The connection criterion is said condition. In this case, the connection criterion comprises that the communication connection between the central server device and the motor-vehicle-internal control device is still established.

After adding the conditional locking instruction to the received unlocking signal, the central server device transmits the unlocking signal, which now comprises the unlocking instruction and the conditional locking instruction, to the motor-vehicle-internal control device. The motor-vehicle-internal control device executes the instructions contained in the received unlocking signal, the at least one unlocking instruction and, if the connection criterion is infringed, the conditional locking instruction. The motor-vehicle-internal control device thus activates the at least one closing device of the motor vehicle in such a way that according to the unlocking instruction, the closing device is unlocked, and subsequently checks according to the locking instruction whether the communication connection to the central server device still exists after at least a predetermined duration. The passage of this duration can be determined, for example, via a timer switch. If the connection criterion is infringed, if there is thus no communication connection between the motor-vehicle-internal control device and the central server device, the motor-vehicle-internal control device activates the at least one closing device so that it is locked. In this case, the conditional locking instruction can comprise checking for the connection criterion repeatedly, i.e., after passage of a first and a second duration and/or multiple durations. It can thus be made possible for the motor-vehicle-internal control device to check whether the connection criterion is fulfilled, for example, at periodic time intervals and/or at at least one predetermined point in time.

By adding the conditional locking instruction to the unlocking signal, it is ensured that the motor vehicle is locked again after a predetermined duration after the unlocking and thus theft protection of the motor vehicle is ensured. A higher level of operating convenience results for a user of the motor vehicle locking system, even if the communication connection between the central server device and the motor-vehicle-internal control device is interrupted, since the user does not have to have any consideration as to whether a further locking signal output by him to the central server device was also actually received by the motor-vehicle-internal control device and thus whether the motor vehicle was actually locked again, on the one hand. On the other hand, the user also does not have to move into range of the motor vehicle upon becoming aware of an interrupted communication connection to lock this motor vehicle again by means of a radio key, for example. It is thus ensured overall that the motor vehicle is only temporarily unlocked in the event of remote-controlled unlocking.

The invention also comprises optional refinements of the method according to the invention, due to which additional advantages result.

In one advantageous design of the method according to the invention, the central server device recognizes an unlocking signal transmitter, which transmits the unlocking signal to the central server device. For example, the unlocking signal contains an identifier, which is specifically assigned by the central server device to a specific device and/or to a specific user. For example, the central server device thus recognizes whether the unlocking signal was transmitted by a main transmitter, for example, an owner of the motor vehicle, and/or an authorized person for the motor vehicle and/or a renter of the motor vehicle and/or a person who merely has the motor vehicle temporarily available. For example, the latter person is a person who places a delivery and/or a package in the motor vehicle in the context of a service and thus only requires temporary access to the motor vehicle. In dependence on the unlocking signal transmitter, the central server device determines the at least one predetermined duration, after the passage of which the motor-vehicle-internal control device is to check for an existing communication connection to the central server device. In this case, the predetermined duration can be predefinable for the respective unlocking signal transmitter. For example, the predetermined duration is longer if the central server device recognizes that the unlocking signal transmitter is the main transmitter than if it is the person who executes the service. The advantage thus results that in the event of an absent communication connection between the central server device and the motor-vehicle-internal control device, the at least one closing device of the motor vehicle will be locked again rapidly if unlocking of the motor vehicle only took place for a service. An owner of the motor vehicle can thus determine how long a specific person and/or a specific service company, for example, a package delivery service, has access to his vehicle.

The central server device preferably determines a distance between the unlocking signal transmitter and the motor vehicle. The at least one predetermined duration is then also determined in dependence on the distance. A duration can be determined on the basis of the determined distance, which the unlocking signal transmitter would require to reach its motor vehicle. It is thus ensured that the motor vehicle is at least unlocked until the unlocking signal transmitter has reached the motor vehicle. For example, the motor vehicle is rented to a renter by an automobile rental company. The automobile rental company can then unlock the motor vehicle via the central server device in the presence of the renter. The motor vehicle is then, in the case of an interrupted communication connection to the central server device, at least not locked until the renter reaches the motor vehicle.

In a further advantageous design of the invention, the passage of the at least one predetermined duration only takes place after recognition of at least one predetermined usage action in the motor vehicle. For example, the conditional locking instruction is added by the central server device that the timer switch is activated, for example, only after recognizing the at least one predetermined usage action. The usage action can be, for example, opening and/or closing of the at least one predetermined closing device. The usage action can also be, for example, a placement of an object in a predetermined region of the motor vehicle, for example, a baggage compartment. For this purpose, the motor vehicle can be equipped with corresponding sensors, which recognize the at least one predetermined usage action. The motor-vehicle-internal control device can be designed to switch on the timer switch upon receiving a sensor signal which conveys the at least one predetermined usage action. Subsequently, the connection criterion is checked after passage of the predetermined duration. In this way, the advantage results that it is ensured that the motor vehicle is not prematurely locked again before a usage action could take place in the motor vehicle. Thus, for example, in the context of a package delivery, the motor vehicle could be unlocked at least as long as a corresponding sensor in the motor vehicle recognizes that a motor vehicle lid is opened and/or a weight is deposited in the motor vehicle, for example, in a predetermined region of the baggage compartment, and/or the motor vehicle lid is closed again.

In one preferred embodiment of the invention, the method according to the invention comprises that after a check for the connection criterion and a determination of an infringement of the connection criterion, the motor-vehicle-internal control device checks whether at least one motor vehicle lid which is associated with the at least one closing device is in a closed closing state. The locking of the associated closing device is only performed when the control device recognizes that the motor vehicle lid is located in the closed closing state. The conditional locking instruction added by the central server device is expanded for this purpose in such a way that it comprises a corresponding instruction. It is thus ensured that the motor vehicle is also actually locked in the case of an activated locking. Locking which is initiated by an interrupted communication connection can thus be avoided during a usage action in the motor vehicle.

The conditional locking instruction preferably furthermore comprises that if the connection criterion is fulfilled and if the at least one closing device of the motor vehicle is unlocked, the at least one closing device still remains unlocked and waits for receipt of a locking signal. In this case, the locking signal comprises at least one locking instruction about locking of the at least one closing device and can also be transmitted to the motor vehicle via the central server device and/or a radio key and/or by a manual operating action. It is thus ensured that the closing device of the motor vehicle still waits for an instruction for subsequent locking after a remote-controlled unlocking. The motor vehicle is automatically locked after a predetermined duration only in the case of an interruption of the communication connection to the central server device.

The invention also includes a central server device for a motor vehicle, which is designed to receive an unlocking signal, wherein the unlocking signal comprises at least one unlocking instruction about unlocking of at least one locking device of the motor vehicle. Furthermore, the central server device is designed to establish a communication connection to a motor-vehicle-internal control device. The central server device is designed to transmit the unlocking signal via the communication connection. After receiving the unlocking signal and before the unlocking signal is transmitted via the communication connection, the central server device is designed to add a conditional locking instruction to the received unlocking signal. The conditional locking instruction comprises, after passage of at least one predetermined duration after the unlocking of the at least one locking device of the motor vehicle, checking for a connection criterion, which comprises that the communication connection is still established. Furthermore, the conditional locking instruction comprises that if the connection criterion is not fulfilled, locking the at least one closing device of the motor vehicle. The central server device is designed to transmit the unlocking signal with the unlocking instruction and the conditional locking instruction via the communication connection.

The central control device moreover has a processor unit, which is configured to carry out an embodiment of the method according to the invention. The processor unit can have at least one microprocessor and/or at least one microcontroller for this purpose. Furthermore, the processor unit can have program code which is configured to carry out the embodiment of the method according to the invention upon execution by the processor unit. The program code can be stored in a data memory of the processor unit.

The invention also includes refinements of the central server device according to the invention, which have features which have already been described in conjunction with the refinements of the method according to the invention for operating a motor vehicle locking system. For this reason, the corresponding refinements of the method according to the invention are not described once again here.

BRIEF DESCRIPTION OF THE DRAWING

An exemplary embodiment of the invention is described hereafter. In the figures.

DETAILED DESCRIPTION

The exemplary embodiment explained hereafter is a preferred embodiment of the invention. In the exemplary embodiment, the described components of the embodiment each represent individual features of the invention to be considered independently of one another, which also each refine the invention independently of one another and thus are also to be considered to be part of the invention individually or in a combination other than that shown. Furthermore, the described embodiment can also be supplemented by further ones of the above described features of the invention.

In the figures, functionally-equivalent elements are each provided with the same reference signs.

Figure 1:
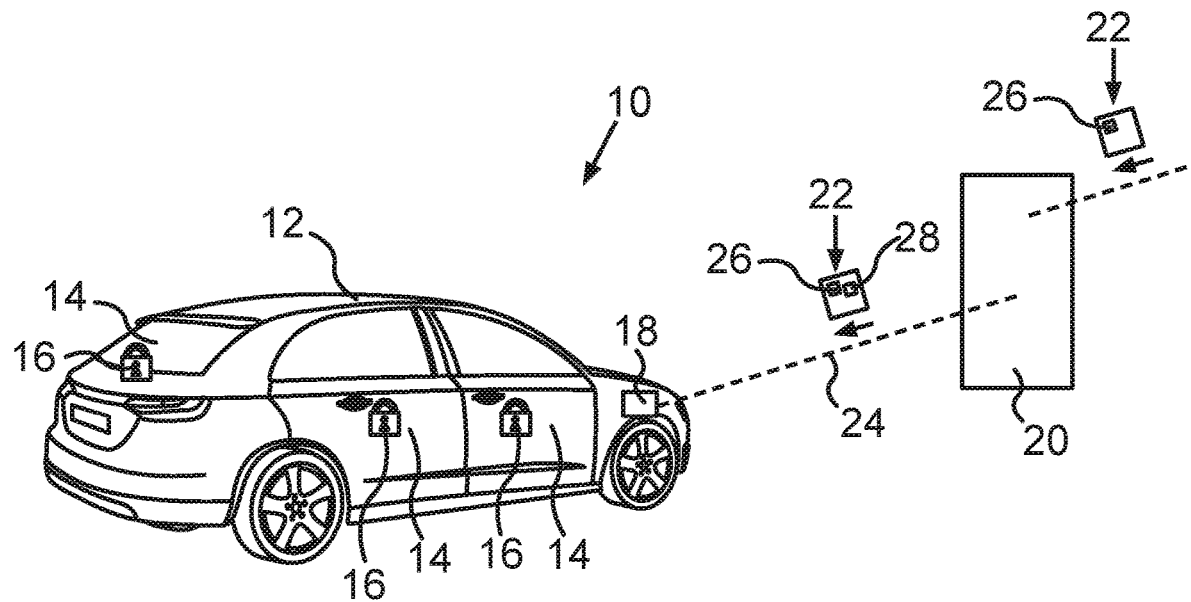
FIG. 1 shows a schematic illustration of a motor vehicle locking system having a central server device and a motor vehicle.

A motor vehicle locking system 10 is schematically illustrated in FIG. 1. A motor vehicle 12 illustrated here has at least one motor vehicle lid 14, for example, the motor vehicle lid 14 is designed as a baggage compartment lid and/or at least one motor vehicle door. The motor vehicle lids 14 illustrated here each have a closing device 16, by means of which the motor vehicle lids 14 can be moved into a locked closing state. The motor vehicle 10 comprises a motor-vehicle-internal control device 18, which is designed for the purpose of controlling the closing devices 16 in the meaning of locking or unlocking. For example, a separate control device 18 can be provided for each of the closing devices 16.

The motor vehicle lids 14 can be unlocked and/or locked in multiple ways, for example, via a manual actuation of the closing devices 16 and/or via an activation of the closing devices 16 by a radio key and/or, as shown here in FIG. 1, via a remote control of the motor-vehicle-internal control device 18 by a central server device 20. The central server device 20 transmits for this purpose an unlocking signal 22 to the motor-vehicle-internal control device 18 to thus unlock at least one of the closing devices 16. For this purpose, the central server device 20 is designed to establish a communication connection 24 to the motor-vehicle-internal control device 18. The communication connection 24 can be established via an Internet connection.

In a known manner, the central server device 20 is designed to receive at least one unlocking signal 22 from, for example, a mobile device, for example, a smart phone and/or a tablet computer. For example, a user of the motor vehicle 12 wishes to unlock it in a remote-controlled manner, for a service provider, which does not have another access option to the motor vehicle 12 than via the central server device 20, and wishes to provide a service, such as a package delivery into the baggage compartment of the motor vehicle 12. The unlocking signal 22 received by the central server device 20 comprises an unlocking instruction 24 which contains information about which closing device 16 of which motor vehicle 12 is to be unlocked. The received unlocking signal 22 can moreover have an identifier, which grants information about an unlocking signal transmitter, which transmits the unlocking signal, to the central server device 20.

Figure 2:
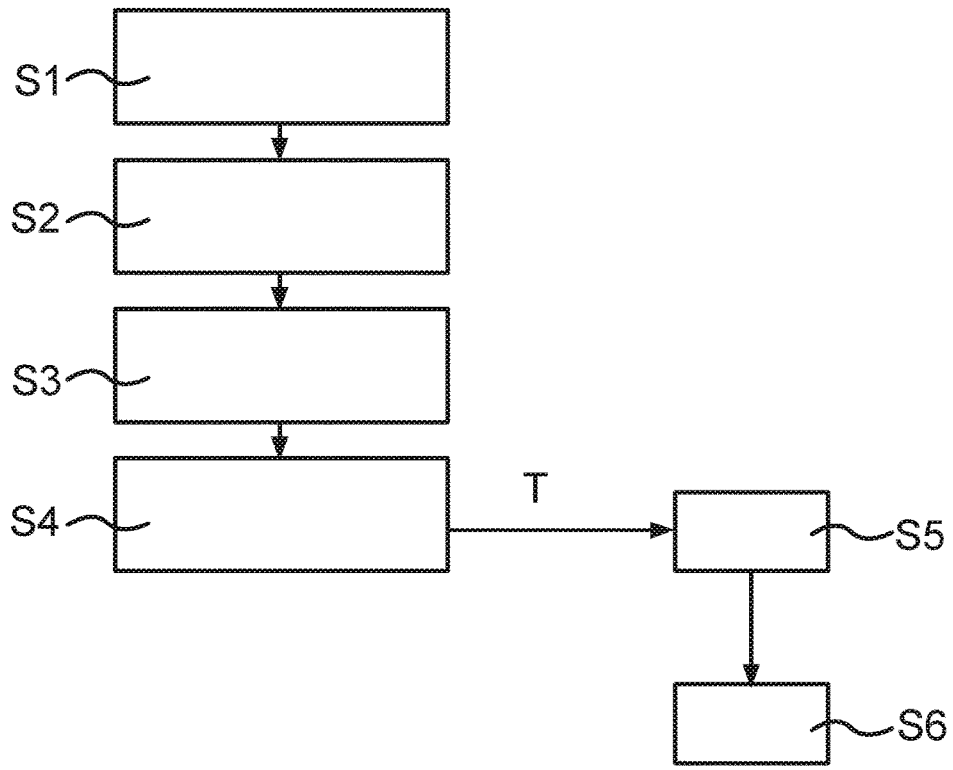
FIG. 2 shows a diagram which explains the method steps for a method for operating a motor vehicle locking system for motor vehicle.

In consideration together with FIG. 2, which schematically illustrates the method steps for operating the motor vehicle locking system 10, the method steps executed by the central server device 20 and the motor-vehicle-internal control device 18 become clear. In a first method step S1, the central server device 20 receives an unlocking signal 22 having an unlocking instruction 26 of a closing device 16 of a motor vehicle 12. In a second method step S2, the central server device 20 adds a conditional locking instruction 28 to the unlocking signal 22. The conditional locking instruction 28 comprises that after passage of at least one predetermined duration T after the unlocking of the at least one closing device 16 of the motor vehicle 12, a connection criterion is to be checked. In this case, the predetermined duration T can be determined by the central server device 20 depending on the motor vehicle 12 and/or motor vehicle lid 14 and/or unlocking signal transmitter. Furthermore, the conditional locking instruction 28 comprises that if the connection criterion is infringed, the at least one locking device 16 of the motor vehicle 12 is to be locked. In this case, the connection criterion comprises that the communication connection 24 between the central server device 20 and the motor-vehicle-internal control device 18 exists. However, the connection criterion can also comprise at least one further criterion, for example, the condition that the motor vehicle lids 14 have to be in a closed closing state before the motor vehicle 12 is locked. A further condition can also read, however, that after passage of the duration T, the motor vehicle lids 14 are activated so that they are located in a closed closing state and can thus be locked.

In a third method step S3, the central server device 20 establishes a communication connection to the motor vehicle 12, to which the unlocking signal 22 is assigned, and transmits the unlocking signal 22, which now has an unlocking instruction 26 and a conditional locking instruction 28.

In a fourth method step S4, the motor-vehicle-internal control device 18 executes the unlocking instruction 26 contained in the unlocking signal 22. For this purpose, at least one of the locking devices 16 is unlocked. The motor-vehicle-internal control device 18 is designed to detect a time beginning with the unlocking of the closing device 16, for example, by means of a timer switch. If the predetermined duration T specified in the conditional locking instruction 28 has passed, the motor-vehicle-internal control device 18 checks in a fifth method step S5 whether the communication connection 24 to the central server device 20 still exists. If a communication connection 24 no longer exists, the motor-vehicle-internal control device 18 thus locks the previously unlocked closing device 16 in a sixth method step S6 according to the conditional locking instruction 28.

Overall, the example shows how a motor vehicle locking system is produced by the invention, so that in the case of a remote-controlled unlocking of at least one closing device of the motor vehicle, it can be ensured by the central server device that the motor vehicle is protected from theft as much as possible.

The invention claimed is:

1. A method for operating a motor vehicle locking system for a motor vehicle, comprising:
   receiving an unlocking signal, which includes at least one un-locking instruction for unlocking of at least one closing device of the motor vehicle, by way of a central server device;
   establishing a communication connection to a motor-vehicle-internal control device of the motor vehicle by way of the central server device and transmitting the unlocking signal via the communication connection to the motor-vehicle-internal control device;
   receiving the unlocking signal and executing the at least one un-locking instruction contained in the unlocking signal by way of the motor-vehicle-internal control device, and
   adding a conditional locking instruction to the received unlocking signal by way of the central server device, wherein the conditional locking instruction comprises, after passage of at least one predetermined duration after the unlocking of the at least one closing device of the motor vehicle, checking for a connection criterion, which comprises that the communication connection is still established, and if the connection criterion is infringed, locking the at least one closing device of the motor vehicle,
   wherein the infringed connection criterion includes that the communication connection between the motor-vehicle-internal control device of the motor vehicle and the central server device is dismissed, and
   wherein the at least one closing device is associated with at least one motor vehicle lid, wherein the motor vehicle lid is movable into an open and/or a closed closing state, wherein the conditional locking instruction includes that if the connection criterion is infringed, the at least one closing device of the motor vehicle is only locked when the at least one motor vehicle lid is located in a closed closing state.

2. The method as claimed in claim 1, wherein the central server device recognizes an unlocking signal transmitter of the received unlocking signal and determines the at least one predetermined duration in dependence on the recognized un-locking signal transmitter.

3. The method as claimed in claim 1, wherein the central server device determines a distance between an un-locking signal transmitter and the motor vehicle and determines the at least one predetermined duration in dependence on the determined distance.

4. The method as claimed in claim 1, wherein the passage of the at least one predetermined duration only takes place after recognition of at least one predetermined usage action in the motor vehicle.

5. The method as claimed in claim 1, wherein the conditional locking instruction furthermore includes that if the connection criterion is fulfilled and while the at least one closing device of the motor vehicle is unlocked at the same time, the at least one closing device remains unlocked and waits for reception of a locking signal, wherein the locking signal includes at least one locking instruction about locking of the at least one closing device of the motor vehicle.

6. A central server device for a motor vehicle, which is configured to receive an unlocking signal, which includes at least one unlocking instruction about unlocking of at least one closing device of the motor vehicle, and which is furthermore configured to establish a communication connection to a motor-vehicle-internal control device of the motor vehicle and to transmit the unlocking signal via the communication connection to the motor-vehicle-internal control device; wherein the central server device is configured to add a conditional locking instruction to the received unlocking signal, wherein the conditional locking instruction includes after passage of at least one predetermined duration after the unlocking of the at least one closing device of the motor vehicle, checking for a connection criterion, which includes that the communication connection is still established, and if the connection criterion is infringed, to lock the at least one closing device of the motor vehicle,
   wherein the infringed connection criterion includes that the communication connection between the motor-vehicle-internal control device of the motor vehicle and the central server device is dismissed, and
   wherein the at least one closing device is associated with at least one motor vehicle lid, wherein the motor vehicle lid is movable into an open and/or a closed closing state, wherein the conditional locking instruction includes that if the connection criterion is infringed, the at least one closing device of the motor vehicle is only locked when the at least one motor vehicle lid is located in a closed closing state.

* * * * *